United States Patent
Busch

[15] 3,694,933
[45] Oct. 3, 1972

[54] STUDENT LEARNING SPACES

[72] Inventor: William Larry Busch, Carbondale, Ill.

[73] Assignee: Avery Coonley School, Inc., Downers Grove, Ill.

[22] Filed: May 20, 1970

[21] Appl. No.: 39,080

[52] U.S. Cl. ...................................... 35/60, 52/36
[51] Int. Cl. ........................................... A47b 41/00
[58] Field of Search .............. 35/60; 52/81, 36, 593

[56] References Cited

UNITED STATES PATENTS

| | | | |
|---|---|---|---|
| 1,419,241 | 6/1922 | Edwards | 52/36 X |
| 1,966,800 | 7/1934 | Katzman | 52/36 X |
| 2,673,132 | 3/1954 | Alderman | 52/36 |
| 3,412,519 | 11/1968 | Brettingen | 52/593 |
| 3,418,765 | 12/1968 | Propst et al. | 52/36 |

*Primary Examiner*—Harland S. Skogquist
*Attorney*—Hume, Clement, Hume & Lee

[57] ABSTRACT

This invention is directed to a system for dividing an otherwise open area into a plurality of individual activity zones by means of a plurality of partially enclosed polyhedron units which are capable of vertical arrangement and, at the same time, are adapted to provide a number of individual activity zones. The partially enclosed polyhedron units can be arranged into a wide variety of self-supporting areas suitable for use by students in undertaking individual learning activities.

9 Claims, 3 Drawing Figures

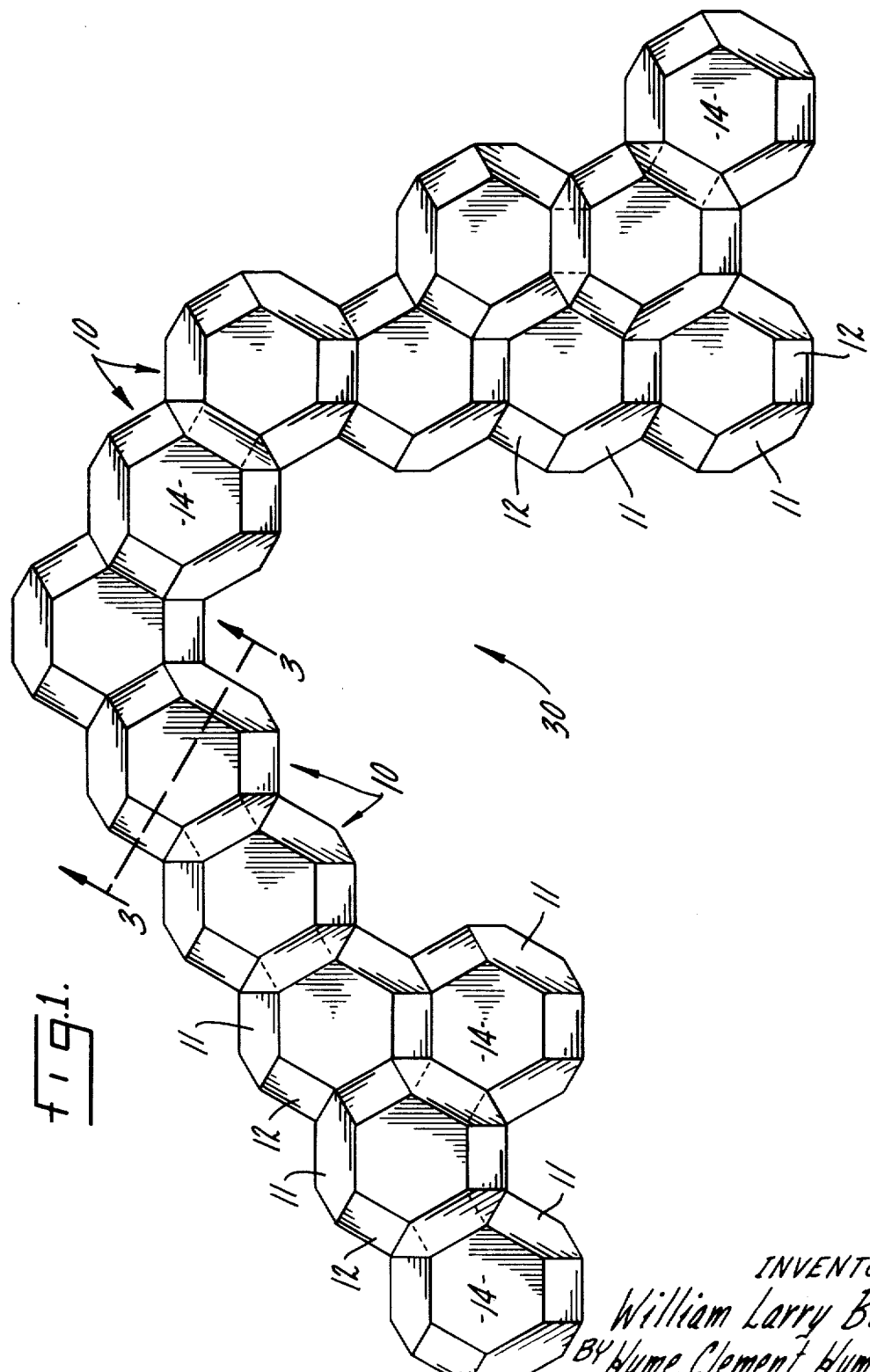

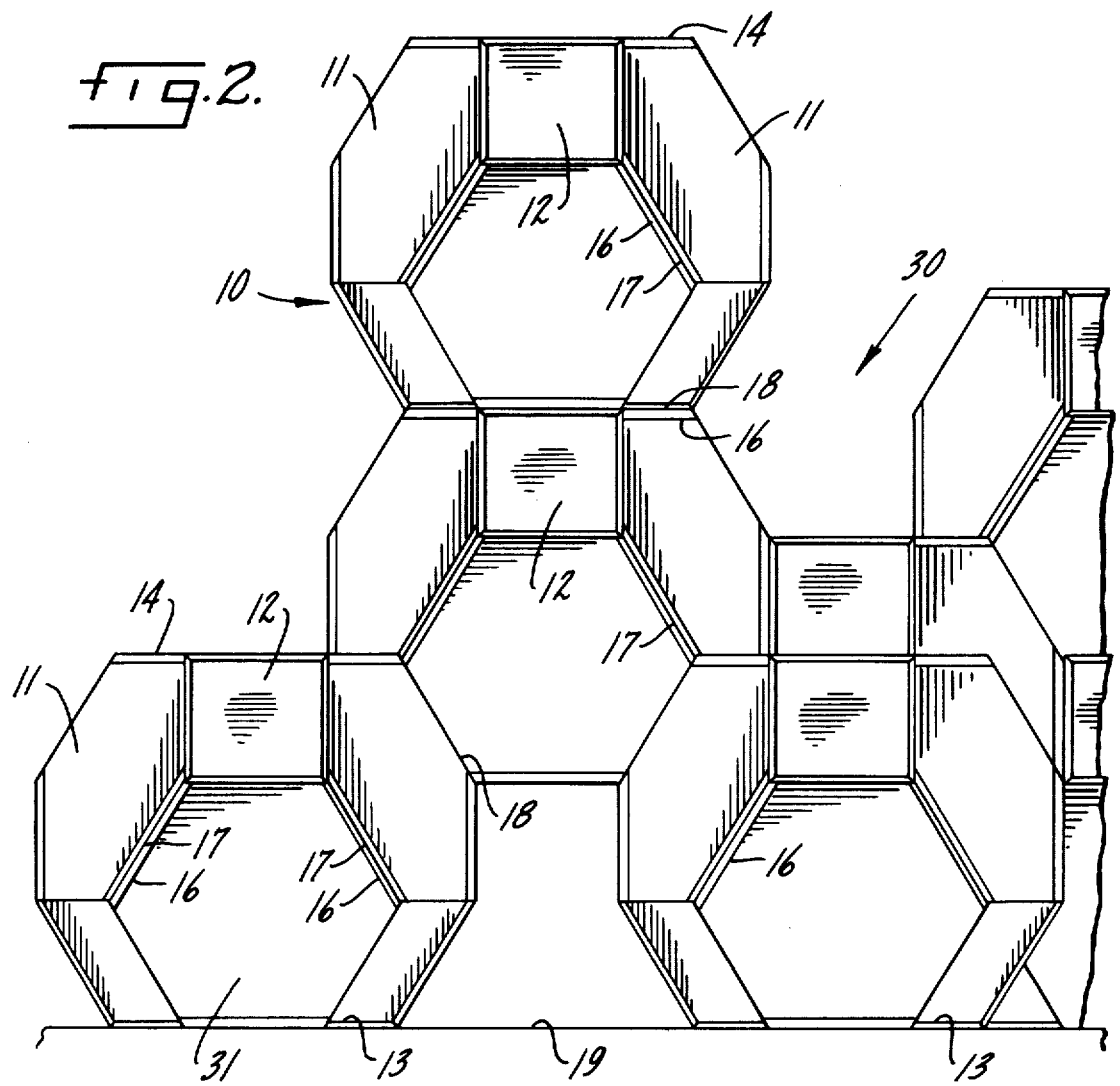
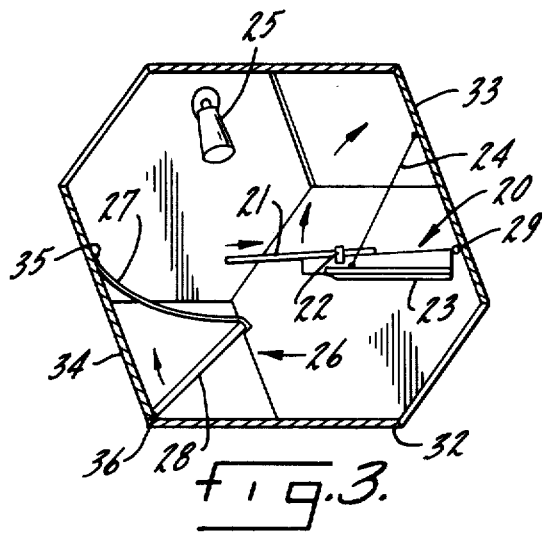

STUDENT LEARNING SPACES

FIELD OF THE INVENTION

This invention relates to a system for dividing an otherwise open space into a series of individual, partially enclosed activity zones and, more particularly to a series of vertically and horizontally arrangeable individualized activity spaces suitable for use by students in a school or the like.

BACKGROUND OF THE INVENTION

It has long been conventional in school classroom design to provide furnishings which include basic desk-chair arrangements for use in both group and individual education exercises. Although the typical desk and chair arrangement has proved to be suitable for many educational tasks, such arrangements have nonetheless been highly unsatisfactory for others.

In particular, a group of students seated in a traditional school classroom face the difficult task of doing individualized work in a large open area and in the presence of a large number of other students. It has been observed, for example, that children at the preschool and primary school levels, who normally have rather short attention spans, find it particularly difficult to concentrate and are easily distracted from individual, creative educational efforts carried out in such open areas.

Furthermore, the present system of chairs and desks provide a rather fixed environment for students which, on the one hand, is conducive to group learning but, on the other hand, is unsuitable for individualized learning and self-expression. As a result, a necessarily increasing emphasis is being placed upon group learning techniques in many schools. This, of course, is accompanied by a significant reduction in the emphasis placed upon the individualized learning process and the resultant inherent limitations placed upon teachers.

Other significant disadvantages also arise from the use of conventional school classroom designs. For example, the typical desk-chair arrangement provides extremely inefficient space utilization since approximately one-half to three-fourths of the overall classroom space is not used. In particular, no attempts have been made to effectively utilize the space in the upper half of most classrooms. This space utilization problem, moreover, is further aggravated by the fact that construction costs for new school buildings are increasing at a staggering rate while, at the same time, the number of students who require educational space is increasing.

Accordingly, a need has developed for a unique classroom design which will allow students to receive the benefits of both group and individualized learning by providing environments suitable for both types of learning experiences.

SUMMARY OF THE INVENTION

According to this invention, a unique system for defining a plurality of individual activity zones within an otherwise open space, such as a classroom, is provided by: (1) a plurality of partially enclosed polyhedron units in which each of the units is capable of vertical as well as horizontal arrangement and each of the units is adapted to provide an individual activity zone; and (2) a series of interconnecting assemblies which serve to join each of the polyhedron units to at least one adjacent unit so that the plurality of partially enclosed units can be easily arranged into a number of self-supporting, individual activity zones which can be utilized by students in carrying out individualized learning.

In particular, the novel individual activity zone system provided by this invention is advantageous because it permits the use of heretofore wasted vertical space in a classroom and, consequently, allows both additional room for other learning activities and more overall efficient space utilization. In addition, the fact that the individual learning spaces of this invention are partially enclosed markedly reduces the amount of distraction caused to students and provides an excellent environment for promoting individualized and creative study.

One preferred embodiment of this invention, namely, the use of truncated octahedron units, is particularly advantageous in that it provides: (1) eight hexagonal mating surfaces for adjacent units, each of which is identical in size, shape, and surface area; (2) high flexibility of arrangement because of the large number of units which can be packed into a given space; and (3) relative ease of manufacture since only one recurring hexagonal unit need be produced and shipped.

It should be also noted that the overall arrangement of student learning spaces provides a unique balance between ease of supervision and sufficient privacy to insure individualized learning. The entire system, moreover, is self-supporting, adaptable to almost any room size, and lends itself well to the use of electronic audio-visual learning devices.

BRIEF DESCRIPTION OF THE DRAWINGS

The invention will be more readily understood by reference to the following drawings in which:

FIG. 1 is a top plan view of one embodiment of the partially enclosed, individualized activity zone system of this invention;

FIG. 2 is a front elevational view of a portion of the individualized activity zones in vertical and horizontal stacked arrangement; and FIG. 3 is a cross-sectional view taken through line 3—3 of FIG. 1 showing a lighting means, work surface, and a seat contained in the interior of one of the activity zones.

DESCRIPTION OF THE PREFERRED EMBODIMENTS

One embodiment of the system of this invention for dividing an otherwise open area, such as a classroom, into a series of individual activity zones is shown in FIGS. 1 and 2. Generally, this system comprises a plurality of individual activity zones 10, also referred to as modules or units, each of which is capable of vertical or horizontal arrangement. Each separate module or unit 10 can be joined to any other unit by means of an interconnecting assembly, such as brackets 16, which serve to join adjacent mating edges 18 of the units and to provide a wide variety of horizontally and vertically spaced patterns for the units characterized in each instance by the fact that a series of individualized, separate activity zones are formed.

Each individualized module or unit 10 is bounded by a plurality of walls 11, a base 13 and roof 14 to provide a partially enclosed area of at least limited privacy. As more modules 10 are added to the overall space-dividing system, more individual activity zones are created, each being isolated and defined apart from each adjacent activity area. The walls 11, base 13, and roof 14 mount and support all of the work surfaces, seating means and other peripheral equipment utilized in conjunction with the individualized activity zones; and numerous horizontally and vertically spaced patterns and arrangements can be made with units 10 to form a plurality of activity zones which are freely interchangeable from one arrangement to another.

Referring now more specifically to FIGS. 1 and 2, a series of individual activity zones 10 are shown in an otherwise open area 30, such as a school classroom. Brackets 16 are provided to interconnect or join together adjacent mating edges 18 of each of the individual modules 10 and to join individual panels at edges 17 in a single module as well. Other suitable interconnecting means, however, such as clamps, can be used to join modules 10 or in some instances the clamps and brackets can be replaced altogether with a suitable frame into which individual panels of the modules 10 are placed. It should be understood, however, that each of the modules 10 can also be premolded from a plastic material or the like and then interconnected by means of an adhesive or by the application of conventional heat sealing techniques.

As shown in FIG. 1, each of the modules 10 provides a partially enclosed activity area for among other reasons to increase privacy and reduce instances of distraction between adjacent modules 10 and otherwise open outside areas 30. In particular, the use of the space dividing system of this invention in the educational field permits a vastly improved environment for individualized learning, student creativity and student self-expression.

Accordingly, the range of open areas provided in modules 10 is adjusted to strike a balance between assuring adequate light, ventilation, and visual contact with outside areas and a partially enclosed space suitable for individualized, private learning activities. It has been determined, for example, that it is desirable in the practice of this invention to have openings over about 15 to 40 per cent of the total surface area of modules 10 to insure a proper balance between privacy and ventilation. In the case of the modules 10 shown in FIGS. 1 and 2, square surfaces 12 are fully open to the outside surroundings.

FIG. 2 particularly illustrates the ease with which the individual modules 10 can be stacked and arranged in vertical as well as horizontal directions. Each module 10 has a number of walls 11 which can be mated with similar walls in adjacent modules. In each case, however, the final arrangement is entirely self-supporting in the sense that inter-module connections made at the mating surfaces provide a fully balanced structure which requires external support only at the point that floor 19 is in contact with base members 13 for the floor level modules. It should also be noted from FIG. 2 that a whole series of vertical frequency levels, e.g., defined as the distance from floor level to the top of each module, can be easily accomplished in the space dividing system of this invention. Thus, for example, as shown in FIG. 2, although only six modules 10 are used, the modules are arranged to achieve five different vertical frequency levels.

The individual modules 10 can be constructed in nearly any geometric or non-geometric shape so long as each module is a partially enclosed unitized structure which is capable of flexibly mating with other units and can be both vertically and horizontally arranged. Preferably, modules 10 are constructed in a known geometric shape, such as a polyhedron, because such known shapes have both a pleasing aesthetic effect and are easily arranged into a number of different and interchangeable final structures.

One highly desirable polyhedron structure which is suitable for use in the practice of this invention is the truncated octahedron. The truncated octahedron (which is used in the modules 10 shown in FIGS. 1, 2 and 3) is a 14-sided polyhedron composed of eight recurring hexagonal units 31 and six recurring square units 12. In particular, the truncated octahedron structure is preferred for use in this invention for a number of reasons. For example, the eight hexagonal surfaces 31 in a truncated octahedron, which form the recurring mating unit between adjacent modules 10, are identical in size, shape, and surface area. As a result, modules 10 made in the shape of a truncated octahedron can be easily arranged in an almost limitless variety of different configurations and can be placed in any size room. In addition, the identity in size, shape, and surface area for each recurring hexagonal surface 31 results in simplified manufacture and shipment of the modules since only one recurring structural component need be produced. Finally, the truncated octahedron shape can be packed into closely spaced arrangements where overall space considerations are limited.

It should also be noted that the square surfaces 12 of the truncated octahedron modules shown in FIGS. 1 and 2 are open to outside area 30. In this way, each activity area is assured of adequate light and ventilation, while at the same time providing both a means for a student located inside module 10 to maintain visual contact with outside area 30 and for a teacher located in the outside area 30 to continuously observe the individual student activities carried out inside modules 10. Moreover, openings 12 in the truncated octahedron modules form a readily accessible passageway for students entering or exiting the module or for students moving from one module to an adjacent module. In addition, the six square surfaces can be used to mate adjacent modules as well.

The specific arrangement of modules shown in FIG. 1 has been successfully employed and tested in a third grade classroom. In particular, this tested space dividing system comprises 21 separate, individualized truncated octahedron modules (only 15 shown) in which seven of the modules are arranged at floor level to provide support for the overall structure.

In addition to being entirely self-supporting, the overall structure is arranged in a manner sufficient to provide six separate vertical frequency levels.

Although the individual modules 10 can be constructed in any size, it has been found that truncated octahedron modules, having an overall height of 45 inches and being made from hexagonal units 31 with edge lengths of about 18 inches, are particularly suitable for use by pre-school age through sixth-grade level students. Moreover, almost any known construction material, including wood, plastic, or metal, can be employed in making the individual modules. It should also be understood that although the individualized space dividing system of this invention is intended primarily for use by students in undertaking individualized learning activities, the same system can be easily adapted for use in larger sizes to accommodate two or more students or can be used in libraries or the like where semi-private reading areas are required.

In FIG. 3, the internal structure of the modules 10 is illustrated. Specifically, it is contemplated that the interior of each of the individual activity zones would include a work surface 20, a storage area 23, a lighting means 25, and a seating means 26. As shown in FIG. 3, the work surface 20 and storage area 23 are formed as an integral unit which is hinged at 29 to one of the side walls 33 of module 10. A rope 24 attached to wall 33 permits the integral work surface and storage area to be lowered into a working position or retracted into a position adjacent to wall 33. The actual working area 21 of work surface 20 is held in place by means of clips 22, disposed on opposite sides of the working area, but, at the same time, is capable of sliding in a forwardly extending position to an extent sufficient to suit the needs of any particular size student.

The seating means 26 is disposed on a lower wall 34 of the module opposite wall 33 and is constructed from a flexible seating surface 27 and a rigid boar-like member 28. One end of the elastic seating surface 27 is attached to wall 34 at 35 while the opposite end of surface 27 is attached to rigid member 28. Accordingly, seating means 26 can be easily retracted into a non-working position by rotating member 28 upwardly and collapsing the entire structure into a position adjacent wall 34. When it is desired to place the seating means 26 into an erect position, rigid member 28 is merely rotated to engage wall 34 and base 32 at corner 36.

Although a number of different interior furnishings can be used with the individualized activity zone system of this invention, it is particularly desirable educationally to provide furnishings which can easily be placed in either retracted or working positions. In this way, for example, the student using the activity or learning space can utilize a high degree of self-expression in controlling the arrangement and positions of the furnishings placed within the interior of the activity areas.

Moreover, it should be recognized that a variety of audio-visual learning devices are particularly suitable for use with the individual activity zone system of this invention. In fact, the entire concept of providing individual learning spaces for students is ideally suited for the programmed learning techniques presently being used in many schools.

As expected, it has been found that the individual activity zone defining system of this invention has provided significant educational benefits for pre-school and primary level students. Specifically, it has been found that partially enclosed activity or learning spaces have provided a unique balance between a creative environment suitable for individual student efforts and ease of teacher supervision. In addition, when used as a part of the total educational process which includes group instruction as well, it has been found that the student learning spaces of this invention promote student creativity, self-expression, and individualized learning.

It should be understood that various modifications of the preferred embodiments of this invention discussed herein can be made without departing from the spirit and scope of the invention.

I claim:

1. Means for defining a multidimensional array of partially enclosed individual activity zones and student work spaces within an otherwise open classroom area comprising:
   a plurality of partially enclosed polyhedron units providing a plurality of individual student activity zones and internal work spaces, each of said units having eight hexagonal surfaces and six square surfaces, each of said hexagonal surfaces being capable of mating with and being joined to a hexagonal surface of another of said units, each of said square surfaces being open, and each of said units being capable of vertical and horizontal arrangement;
   interconnecting means for joining each of said polyhedron units to at least one adjacent unit without limiting the internal work space in said units; and
   whereby said plurality of partially enclosed polyhedron units can be arranged into a variety of self-supporting arrays of individual activity zones and internal work spaces.

2. The individual activity zone defining means of claim 1 wherein said interconnecting means are brackets, said brackets being capable of joining individual panels of a single polyhedron unit as well as adjacent mating surfaces of different units.

3. The individual activity zone defining means of claim 1 wherein said partially enclosed polyhedron units have at least eight mating surfaces, each of said surfaces being identical in size, shape, and surface area.

4. The individual activity zone defining means of claim 1 wherein said polyhedron units define an individual activity zone by means of a plurality of outer walls which surround and define an inner working space, said working space having disposed therein:
   a lighting means to illuminate said inner working space;
   a working surface;
   a seating means disposed opposite said working surface; and
   a storage means to accommodate a plurality of work items.

5. The individual activity zone defining means of claim 4 wherein said inner working space is provided with an audio visual learning means.

6. The individual activity zone defining means of claim 1 wherein said partially enclosed polyhedron units are truncated octahedrons.

7. The individual activity zone defining means of claim 1 wherein said eight hexagonal surfaces of said polyhedron units surround and define an internal working space, said working space having disposed therein:
   a lighting means to illuminate said internal working space;
   a retractable working surface;
   a retractable seating means disposed opposite said working surface; and storage means to accommodate a plurality of work items.

8. Student learning spaces adapted for use in a school classroom comprising:

a plurality of partially enclosed polyhedron structures, each of said structures being adapted to provide a partially enclosed, individualized learning area and internal work space;

interconnecting means for joining each of said polyhedron structures to at least one adjacent structure without limiting the internal space in said structures;

said structures having eight mating hexagonal surfaces, and six square surfaces each of said hexagonal surfaces being identical in size, shape, and surface area, and each of said square surfaces being open;

said structures having disposed therein a plurality of peripheral educational equipment; and whereby said plurality of partially enclosed polyhedron structures can be arranged into a variety of self-supporting arrangements of individualized learning areas.

9. The student learning spaces of claim 8 wherein said polyhedron structures are truncated octahedrons.

* * * * *